United States Patent
Flynn et al.

(10) Patent No.: US 8,566,607 B2
(45) Date of Patent: Oct. 22, 2013

(54) CRYPTOGRAPHY METHODS AND APPARATUS USED WITH A PROCESSOR

(75) Inventors: William T. Flynn, Rochester, MN (US); David A. Shedivy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2225 days.

(21) Appl. No.: 11/213,232

(22) Filed: Aug. 26, 2005

(65) Prior Publication Data

US 2007/0050641 A1 Mar. 1, 2007

(51) Int. Cl.
H04L 9/28 (2006.01)

(52) U.S. Cl.
USPC .......................................... 713/189; 711/138

(58) Field of Classification Search
USPC ............ 380/28, 228, 262, 279; 713/189, 190; 345/506; 711/138, 207
See application file for complete search history.

(56) References Cited

U.S. PATENT DOCUMENTS

| | | | |
|---|---|---|---|
| 4,780,905 A | | 10/1988 | Cruts et al. |
| 5,058,164 A | | 10/1991 | Elmer et al. |
| 5,182,771 A | | 1/1993 | Munich et al. |
| 5,724,422 A | * | 3/1998 | Shang et al. ................... 713/190 |
| 7,134,139 B2 | * | 11/2006 | Hetzler et al. ..................... 726/2 |
| 7,240,134 B2 | * | 7/2007 | Klug et al. ..................... 710/107 |
| 2003/0147267 A1 | | 8/2003 | Huttunen |
| 2003/0154412 A1 | * | 8/2003 | Hetzler et al. ................ 713/202 |
| 2005/0097250 A1 | * | 5/2005 | Klug et al. ..................... 710/107 |
| 2007/0005893 A1 | * | 1/2007 | Mates ............................ 711/118 |
| 2007/0050642 A1 | | 3/2007 | Flynn et al. |
| 2008/0147992 A1 | * | 6/2008 | Raikin et al. ................... 711/146 |

OTHER PUBLICATIONS

Rivest, R. "The MD5 Message-Digest Algorithm", RFC 1321, Apr. 1992. Available at http://www.ietf.org/rfc/rfc1321.txt (downloaded Feb. 4, 2009).

* cited by examiner

*Primary Examiner* — Fikremariam A Yalew
(74) *Attorney, Agent, or Firm* — Dugan & Dugan PC

(57) ABSTRACT

In a first aspect, a first cryptography method is provided. The first method includes the steps of (1) in response to receiving a request to perform a first operation on data in a first memory cacheline, accessing data associated with the first memory cacheline; (2) performing cryptography on data of the first memory cacheline when necessary; and (3) speculatively accessing data associated with a second memory cacheline based on the first memory cacheline before receiving a request to perform an operation on data in the second memory cacheline. Numerous other aspects are provided.

14 Claims, 2 Drawing Sheets

CRYPTOGRAPHY METHODS AND APPARATUS USED WITH A PROCESSOR

CROSS-REFERENCE TO RELATED APPLICATIONS

1. Field of the Invention

The present invention relates generally to computer processors, and more particularly to cryptography methods and apparatus for use with processors.

2. Background

A large latency may be associated with a read or write operation performed by a conventional computer system when data cryptography is employed. Such latency may adversely affect throughput of the computer system. Accordingly, improved cryptography methods and apparatus are desired that reduce latency during read and/or write operations.

SUMMARY OF THE INVENTION

In a first aspect of the invention, a first cryptography method is provided. The first method includes the steps of (1) in response to receiving a request to perform a first operation on data in a first memory cacheline, accessing data associated with the first memory cacheline; (2) performing cryptography on data in the first memory cacheline when necessary; and (3) speculatively accessing data associated with a second memory cacheline based on the first memory cacheline before receiving a request to perform an operation on data in the second memory cacheline.

In a second aspect of the invention, a first apparatus is provided. The first apparatus is a cryptography apparatus. The first apparatus includes controller logic, adapted to couple to a processing unit and a memory of a system, and further adapted to (a) in response to receiving a request to perform a first operation on data in a first memory cacheline, access data associated with the first memory cacheline; (b) perform cryptography on data in the first memory cacheline when necessary; and (c) speculatively access data associated with a second memory cacheline based on the first memory cacheline before receiving a request to perform an operation on data in the second memory cacheline.

In a third aspect of the invention, a first cryptography system is provided. The first system includes (1) a processing unit; (2) a memory; and (3) controller logic, coupled to the processing unit and memory, and adapted to (a) in response to receiving a request to perform a first operation on data in a first memory cacheline, access data associated with the first memory cacheline; (b) perform cryptography on data in the first memory cacheline when necessary; and (c) speculatively access data associated with a second memory cacheline based on the first memory cacheline before receiving a request to perform an operation on data in the second memory cacheline. Numerous other aspects are provided in accordance with these and other aspects of the invention.

Other features and aspects of the present invention will become more fully apparent from the following detailed description, the appended claims and the accompanying drawings.

DETAILED DESCRIPTION

The present invention provides improved cryptography methods and apparatus. For example, a system of the present invention may perform a first read or write operation that may involve cryptography (e.g., in response to a request from a system master). The first read or write operation may be associated with a first cacheline. While performing the first operation, one or more additional read or write operations, which may involve cryptography, may be initiated by the system. The one or more additional read or write operations may be speculative. More specifically, the additional read or write operations are not initiated in response to a request from a system master to access a cacheline. Such additional read or write operations may serve as a provisional access of a cacheline successive to the first cacheline. In this manner, if the system receives a subsequent request from a system master to perform a read or write operation on a cacheline that is associated with a speculative access (e.g., while processing the first read or write operation), one or more portions of the second request already may have been performed. Therefore, the second request may complete sooner. Consequently, a latency associated with the second request may be reduced and/or eliminated. At least one cryptography engine of the system may be employed to perform cryptography associated with the first operation and at least one cryptography engine of the system may be employed to perform cryptography associated with a speculative operation.

In this manner, the present invention may provide improved cryptography methods and apparatus. The improved methods and apparatus may reduce a latency associated with read and/or write operations which may involve cryptography (e.g., compared to a latency associated with a conventional system) performed by the system.

Figure 1:
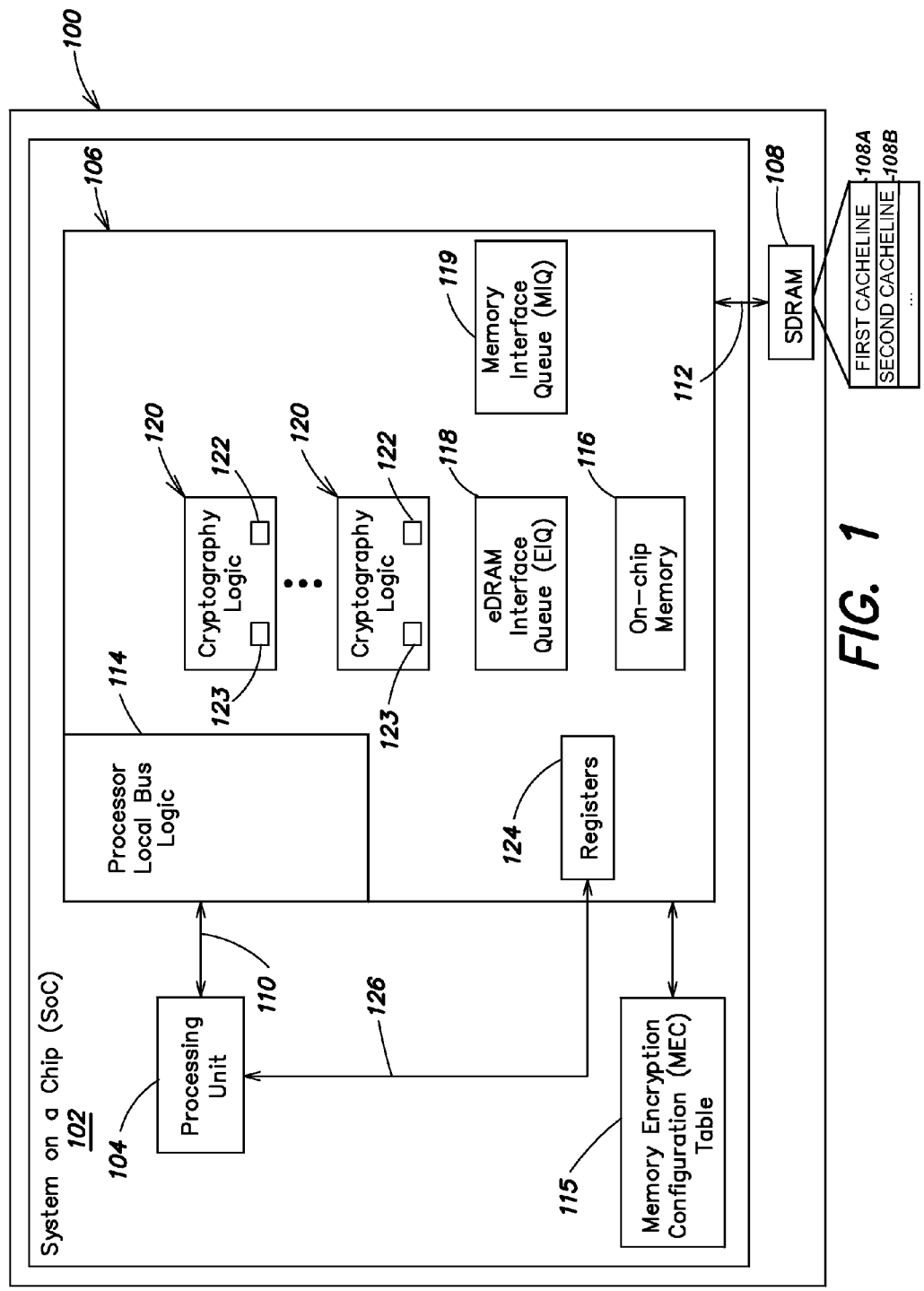
FIG. 1 is a block diagram of a cryptography apparatus in accordance with an embodiment of the present invention.

FIG. 1 is a block diagram of a cryptography apparatus in accordance with an embodiment of the present invention. With reference to FIG. 1, the cryptography system 100 may be a computer system or another similar device. The cryptography system 100 may include a system on a chip (SoC) 102 or another suitable device. The SoC 102 may include a processing unit 104 adapted to receive requests to perform read and/or write operations on cachelines of memory. The processing unit 104 may be coupled to controller logic 106 (e.g., a memory controller unit), which may be coupled to a first memory 108, such as SDRAM or another suitable memory. The first memory 108 may be external to the SoC 102 (although the first memory 108 may be included in the SoC 102). More specifically, a first bus 110 (e.g., a processor local bus (PLB)) may couple the processing unit 104 to the controller logic 106, and a second bus 112 (e.g., a memory bus, such as a DDR bus) may couple the controller logic 106 to the first memory 108.

The controller logic 106 may be adapted to reduce a latency associated with a read and/or write operation that may involve cryptography. More specifically, the controller logic 106 may be adapted to access data from the first memory 108 (e.g., from a first cacheline (or first memory cacheline) 108a of the first memory 108) in response to receiving a request to perform a first operation on data in the first cacheline. If necessary, the controller logic 106 is adapted to perform cryptography on the data in the first memory cacheline. Additionally, the controller logic 106 may be adapted to initiate one or more speculative accesses of data (e.g., data associated with at least one memory cacheline) based on the first operation. For example, the controller logic 106 may be adapted to access data associated with a second memory cacheline (or second cacheline) 108b which is based on the first memory cacheline before receiving a request to perform an operation on data in the second memory cacheline.

When the controller logic 106 receives the request to perform a first operation (e.g., to read data from or write data to the first memory cacheline), the controller logic 106 may retrieve data associated with the first memory cacheline. Based on such information, the controller logic 106 may read data from the first cacheline and employ cryptography to decrypt such data when necessary, or employ cryptography to encrypt data to be written to the first cacheline when necessary and write such data to the first cacheline. More specifically, the controller logic 106 may include PLB logic 114 adapted to receive a request to perform an operation on a cacheline of the first memory 108. In response to receiving such request, the PLB logic 114 may be adapted to access a memory encryption configuration (MEC) table 115 (e.g., to perform a table lookup). The MEC table 115 may store data associated with one or more cachelines of the first memory 108. For example, for the cachelines of the memory 108, the MEC table 115 may include at least one entry associated with a memory cacheline that indicates the location of additional data associated with the memory cacheline. Additionally, the MEC table 115 may store data associated with one or more cachelines of the first memory 108 indicating whether cryptography should be performed on data stored in such cachelines, respectively. More specifically, the controller logic 106 may include an on-chip memory 116 (e.g., an eDRAM or another suitable memory) which may store message counters and/or checksums associated with one or more cachelines of memory 108, respectively. Alternatively, such message counters and/or checksums may be stored in the first memory 108 (e.g., an external SDRAM). Therefore, the MEC table 115 may store information indicating whether such data is stored in the first memory 108 and/or the on-chip memory 116 (although such data may be stored in another location).

Based on data obtained from the MEC table lookup, the PLB logic 114 may initiate a request to access at least one or more of the first memory 108 and the on-chip memory 116. The controller logic 106 may include an on-chip memory queue 118 (e.g., an eDRAM interface queue (EIQ)) adapted to store one or more requests to access the on-chip memory 116. Similarly, the controller logic 106 may include a memory interface queue (MIQ) 119 adapted to store one or more requests to access the first memory 108. The on-chip memory queue 118 and memory interface queue 119 may include respective controllers. Such requests to access memory 108, 116 may be tagged or associated with information about the type of the request and destination of the request. In this manner, in response to a request that requires cryptography, data may be provided to at least one of a plurality of cryptography logic units 120 included in the controller logic 106. Each cryptography logic unit 120 may include a buffer 122 adapted to store data. Further, each cryptography logic unit 120 may include a sequencer 123 adapted to detect data destined for the cryptography logic unit 120. Each cryptography logic unit 120 may be adapted to encrypt one or more portions of data to be written to memory 108 and/or decrypt one or more portions of data read from the memory 108. For example, one or more of the plurality of cryptography logic units 120 may be adapted to perform cryptography pursuant to Advanced Encryption Standard (AES) (See US FIPS PUB 197). In one embodiment, the controller logic 106 may include eight cryptography logic units 120, two of which may perform cryptography on data associated with a single request. However, the controller logic 106 may include a larger or smaller number of cryptography logic units 120. Additionally, a larger or smaller number of cryptography logic units 120 may be employed to perform cryptography on data associated with a request. Further, each cryptography logic unit 120 may be adapted to provide decrypted data to the processing unit 104 via the PLB logic 114 and/or provide encrypted data to the first memory 108 via the second bus 112. The PLB logic 114, EIQ 118, MIQ 119 and each cryptography logic unit sequencer 123 may act as or serve to initiate independent processes.

The plurality of cryptography logic units 120 may access data stored in one or more of a plurality of registers 124 that may be included in the controller logic 106 to perform cryptography. A third bus 126 (e.g., a device control register (DCR) bus) may couple the processing unit 104 to the plurality of registers 124 such that the processing unit 104 may update data in such registers 124, thereby determining how the plurality of cryptography units 120 perform cryptography on data from a cacheline of the memory 108.

Figure 2:
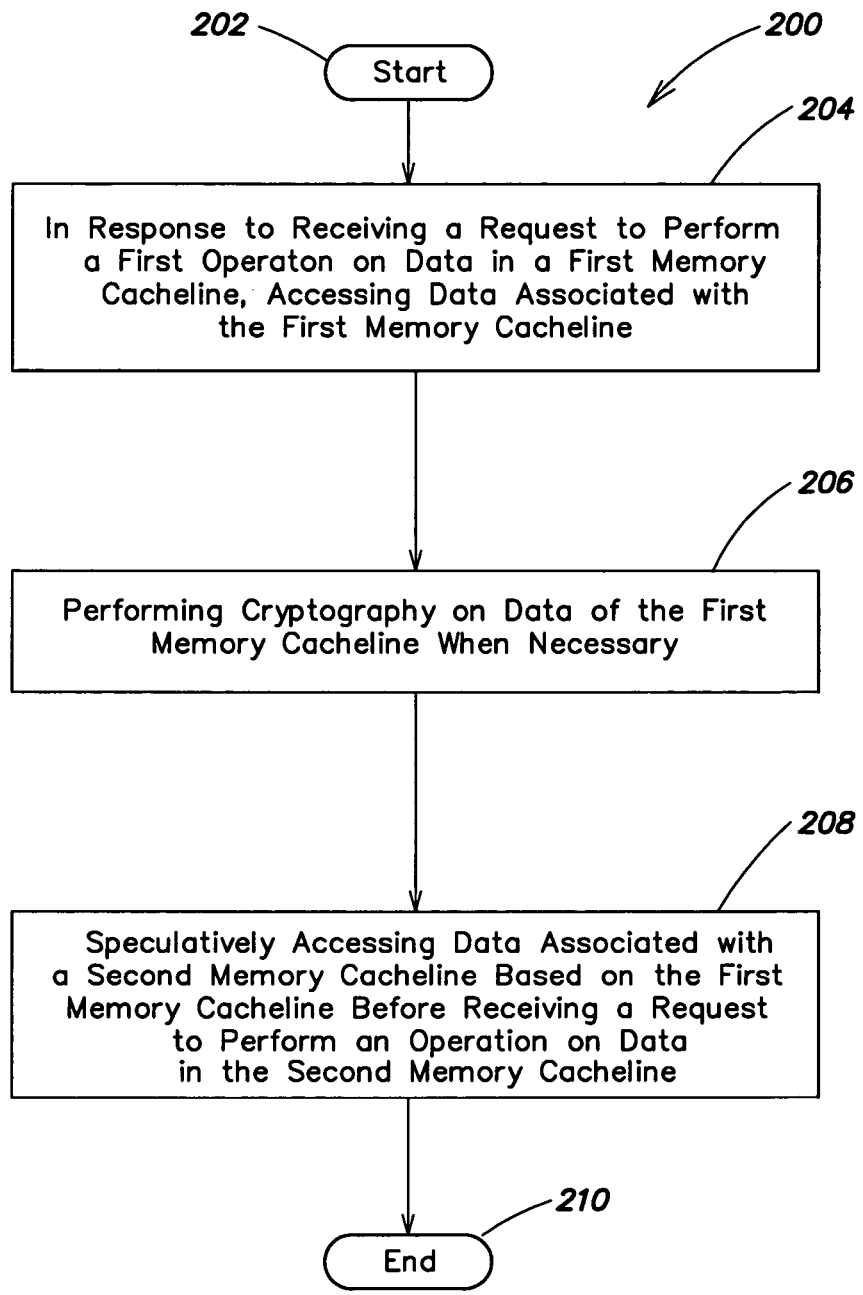
FIG. 2 illustrates an exemplary cryptography method in accordance with an embodiment of the present invention.

The operation of the cryptography system 100 is now described with reference to FIG. 1 and with reference to FIG. 2 which illustrates an exemplary cryptography method in accordance with an embodiment of the present invention. With reference to FIG. 2, in step 202, the method 200 begins. The processing unit 104 of the cryptography system 100 may receive one or more requests to perform a read or write operation on data stored in a cacheline of memory 108. In step 204, in response to receiving a request to perform a first operation on data in a first memory cacheline, data associated with the first memory cacheline may be accessed. The processing unit 104 may provide such request to the PLB logic 114 via the first bus 110. Based on the request to perform the first operation on data in a first cacheline of the memory 108, the PLB logic 114 may access data associated with the first cacheline in the MEC table 115 (e.g., perform a MEC table lookup). Based on such data, the PLB logic 114 may access additional data associated with the first cacheline from the first memory 108 and/or the on-chip memory 116. More specifically, based on data obtained from the MEC table lookup, the PLB logic 114 may initiate a request to access the additional data associated with the first cacheline from the first memory 108 and/or the on-chip memory 116. A request to access data associated with the first cacheline from the first memory 108 may be placed in the memory interface queue 119. Similarly, a request to access data associated with the first cacheline from the on-chip memory 116 may be placed in the on-chip memory queue 118. A request to the on-chip memory queue 118 may be tagged or associated with type data, such as a cryptography key, a message counter, a checksum and/or bus data (although the request may be associated with different and/or additional type data). Further, a request to the on-chip memory queue 118 may include destination data, such as whether read data is to be returned to a cryptography logic unit 120 (e.g., a number of a cryptography logic unit 120 to which data is to be returned) or whether data is to be returned to the PLB logic 114.

Because of bank conflicts or the like, the on-chip memory may return data out of order. Therefore, once accessed data is valid on an interface of the on-chip memory 116, respective sequencers 123 of the cryptography logic units 120 may employ the information tagged or associated with a request to determine whether the cryptography logic unit 120 corresponding thereto is the target of such data and to determine the type of such data. Data may be associated with a request to the first memory 108 in a similar manner. In this manner, data accessed from the first memory 108 may be forwarded to an appropriate cryptography logic unit 120 when necessary.

In step 206, cryptography may be performed on data in the first memory cacheline when necessary. More specifically, based the data associated with the first memory cacheline obtained from the MEC table lookup, first memory 108 and/or on-chip memory 116, the cryptography system 100 may determine whether cryptography should be performed on data stored in the first cacheline. Assuming so, cryptography may be performed on data of the first memory cacheline. For example, if the first operation is a read operation, data in the first cacheline may be retrieved from the first memory 108 and provided to one or more of the plurality of cryptography logic units 120. Such cryptography units 120 may perform cryptography on the retrieved data. More specifically, such cryptography units 120 may decrypt the retrieved data. Thereafter, the cryptography units 120 may provide such decrypted data to the PLB logic 114, which may provide the decrypted data to the processing unit 104. In this manner, the read operation may be performed on data of the first cacheline. Alternatively, if the first operation is a write operation, data to be written to the first cacheline of memory 108 may be provided to the PLB logic 114 from the processing unit 104. The PLB logic 114 may store such data in respective buffers 122 of one or more cryptography logic units 120. The cryptography units 120 may encrypt such data and store the encrypted data in the first memory 108. In this manner, data may be written to the first cacheline of the memory 108.

Thus, when a sequencer 123 associated with a request to perform an operation receives a cryptography key message counter and/or address information, the cryptography logic unit 120 may encrypt data associated with the request.

The buffer 122 of the cryptography logic unit 120 may store an encrypted message, plain text data or encrypted data. Because an order in which data may be received by a cryptography logic unit 122 may be unpredictable, entries of the buffer 122 may be tagged or associated with state information which may indicate whether the sequencer 123 has loaded the buffer 122 with an encrypted message, the PLB logic 114 has loaded the buffer 122 with plain text data (e.g., for a store operation), the MIQ 119 has loaded the buffer 120 with encrypted data (e.g., for a read operation) and/or whether the buffer 122 has loaded itself with valid data (e.g., encrypted data for a store operation or decrypted data for a read operation). In the last case, the buffer 122 may include either a message or data (and the other may be arriving) so an exclusive-or (XOR) or another suitable operation may be performed on data and the buffer 122 may be reloaded.

As data becomes valid, a sequencer 123 of a cryptography logic unit 120 may notify the MIQ 119 for a store operation, so the operation may be completed when bus conditions are met. Further, for a store operation, a sequencer 123 of a cryptography logic unit 120 may initiate a request to store a message counter and/or a checksum to the EIQ 118 or MIQ 119. In contrast, as data becomes valid, a sequencer 123 of the cryptography logic unit 120 may notify the PLB logic 114 for a read operation, so the operation may be completed when bus conditions are met. For the read operation, a checksum associated with data of a memory cacheline may have been read and checked (if a checksum exists) before the data is considered valid.

It is assumed above that the operation on the first cacheline requires cryptography. However, the cryptography system 100 may determine (e.g., by performing the MEC table lookup) that the operation on the first cacheline may not require cryptography. In such case, the cryptography units 120 may be bypassed. For example, for a read operation, data retrieved from the first memory 108 may be provided to the PLB logic 114, and thereafter, to the processing unit 104 via the PLB bus 110. Similarly, for a write operation, data received by the PLB logic 114 from the processing unit 104 (e.g., via the PLB bus 110) may be written to the first memory 108.

In step 208, data associated with a second memory cacheline based on the first memory cacheline may be speculatively accessed before receiving a request to perform an operation on data in the second memory cacheline. More specifically, to reduce a time required to perform an operation, an operation for which a request is subsequently received, the cryptography system 100 may initiate one or more speculative accesses of data associated with one or more cachelines, respectively. The one or more cachelines may be based on the first cacheline (e.g., the cachelines may be successive). For example, the cryptography system 100 may initiate a speculative access of data associated with a second cacheline successive with the first cacheline (although the second cacheline may be positioned differently (e.g., may not be successive with the first cacheline)). More specifically, while accessing data associated with the first cacheline, the cryptography system 100 (e.g., the PLB logic 114 thereof) may also access and/or initiate an access of data associated with the second cacheline. In this manner, data associated with the second cacheline may be retrieved from the MEC table 115, first memory 108 and/or the on-chip memory 116 (in a manner similar to that used to retrieve the data associated with the first memory cacheline).

The cryptography system 100 may assume the second request is for the same type of operation (e.g., a read or write) as the first operation. Therefore, if the cryptography system 100 receives a request (e.g., second request) to perform a second operation on one of the cachelines corresponding to a speculative access, the cryptography system 100 may have already retrieved data associated with such cacheline before the request to perform the operation is received. In this manner, data required by one or more cryptography logic units 120 to complete an operation may have been retrieved before receiving the request to perform the operation. Consequently, less processing (e.g., less data accesses) may be necessary after the request is received to complete the operation. Thus, a time required to perform such operation, and therefore, a latency associated therewith may be reduced. Based on data associated with a cacheline corresponding with a speculative access (e.g., and the second operation), the cryptography system 100 may determine whether the second operation requires cryptography, and if so, may employ cryptography to complete the operation. In this manner, speculative accesses may occur by starting idle cryptography logic units 120 so they may begin an encryption or decryption process for at least one cacheline subsequent to the cacheline (e.g., the first cacheline) corresponding to the first (e.g., original) request. Sequencer status, address and/or other suitable material may be employed to select a cryptography logic unit 120 to perform the speculative access. The cryptography system 100 may assume the speculative request type (e.g., a request for a read or write operation) is the same as the type of the first request.

Sequencers 123 of the cryptography logic units 120 operating on speculative operations may operate in a manner similar to sequencers 123 of cryptography logic units 120 operating on an actual operation. The speculative accesses may be performed so that such accesses may not be visible to the cryptography system 100. For example, a message counter or a checksum may not be stored while a speculative access is performed. A speculative access may proceed so that message data may be encrypted before actual data has been accessed or received. At any point during a speculative access, the speculative access may be converted to an actual access, for example, in response to a request to perform an operation of a type matching that of the speculative access and corresponding to the cacheline of speculative access. If a speculative access is converted to an actual access, a cryptography logic unit 120 may complete encryption or decryption of data destined for or received from the cacheline. Because the cryptography logic unit 120 is now handling an actual request, the cryptography logic unit 120 may notify other units 120 of data ready and message counter and/or checksum store requests.

Alternatively, while performing one or more speculative accesses of data associated with one or more cachelines (e.g., the second cacheline), respectively, the cryptography system 100 may receive a request to perform one or more operations (e.g., a third operation) on respective cachelines (e.g., a third cacheline), which do not correspond to a speculative access. Therefore, to efficiently allocate system resources (e.g., cryptography logic units 120), the cryptography system 100 may stop one or more of the speculative accesses and reallocate such resources to perform the one or more operations on respective cachelines that do not correspond to a speculative access. In this manner, a cryptography logic unit 120 which is performing a speculative access may be restarted because a subsequent request may require the cryptography logic unit 120 for a real or another speculative access request. The cryptography logic unit 120 may be restarted with little or no latency added to such request.

Thereafter, step 210 may be performed. In step 210, the method ends. Through use of the present method, a time required to perform an operation (e.g., after receiving a request to perform the operation) may be reduced. Consequently, a latency associated with such operation may be reduced. For example, logic of the cryptography system 100, such as controller logic 106, may be employed to perform accesses associated with a real read or write operation that may require cryptography and to perform accesses associated with one or more speculative read or write operations that may require cryptography. In this manner, a memory controller unit may provide data encryption/decryption associated with an operation using one or more cryptography logic units 120 (e.g., hardware encryption engines). The cryptography logic units 120 may operate independently and perform speculative accesses as described above so as to lower an average latency for encrypted storage accesses, thereby improving throughput.

In one embodiment, a plurality of (e.g., four) identical cryptography logic units 120 (e.g., hardware encryption engines) may be employed in the cryptography system 100. The cryptography logic units 120 may be operated independently and may work on any combination of read and/or write operations at a given time. In this manner, overlapping of operations may be allowed in a bus system where multiple operation requests may be outstanding at any given time. One or more such operations may be tagged or identified as speculative (e.g., such operations may be performing an encryption or decryption which has not been requested by a system master). Therefore, if the system subsequently receives a request which "hits" a speculative operation performed by one or more of the cryptography logic units 120, a latency to complete that operation may be reduced by some number of cycles (e.g., depending on when the request was received relative to a start of the speculative operation). The present invention may be useful to reduce a time required to access temporally-local data for a string of read or write operations such as during a block-move operation. These operation requests may be either separate bus requests or a burst operation request. The present invention may also be useful for instruction accesses from encrypted memory or similar localized data accesses.

Further, in some embodiments, a rotating encryption algorithm may be employed for an access (e.g., a speculative access). For example, different memory cachelines may be encrypted/decrypted differently. Depending on whether data is being read from or written to a cacheline, a different encryption/decryption key may be employed while performing cryptography on the cacheline.

In some embodiments, a message counter associated with a cacheline may be incremented by a cryptography logic unit 120 as part of a speculative access when a speculative access has transitioned to an access associated with an actual request (e.g., in response to an actual request to perform an operation on the cacheline). Because multiple cryptography logic units 120 may be started parallel, multiple increments may be required in parallel. Further, in some embodiments, boundary conditions for message counter fetches may prevent all of the plurality of the cryptography logic units 120 from being used to perform speculative operation.

The foregoing description discloses only exemplary embodiments of the invention. Modifications of the above disclosed apparatus and methods which fall within the scope of the invention will be readily apparent to those of ordinary skill in the art. For instance, as described above, the cryptography system 100 may initiate one or more speculative accesses of data associated with one or more cachelines, respectively. In some embodiments, during a speculative access of data associated with a cacheline, the cryptography system 100 may additionally access the data stored in the cacheline. The data stored in the cacheline corresponding to the speculative access may be stored in a buffer 122 of one or more cryptography logic units 120. In this manner, during a speculative read operation on a cacheline, actual cacheline data may be fetched and cached in a buffer 122 of at least one cryptography logic unit 120 before and/or after cryptography until an actual request to perform an operation on the cacheline is received or the cryptography logic unit 120 is reassigned for another request. Such extra memory access may require an allocation of extra memory bandwidth. However, the cryptography system 100 may selectively operate in a mode in which cacheline data may be fetched during a speculative access. For example, the cryptography system 100 may update data (e.g., a bit, bus tag, address range, etc.) stored in register which enables the cryptography system 100 to operate in the mode described above. Software may update that data stored in the register, and therefore, selectively enable/disable operation in such mode. In this manner, encrypted buffers or the like, which may be accessed by software and may benefit from pre-fetching of data, may be created in memory (e.g., the first memory 108).

Accordingly, while the present invention has been disclosed in connection with exemplary embodiments thereof, it should be understood that other embodiments may fall within the spirit and scope of the invention, as defined by the following claims.

The invention claimed is:

1. A cryptography method, comprising:
   providing logic on a computer system for:
   in response to receiving a request to perform a first operation on data in a first memory cacheline, accessing data associated with the first memory cacheline;

using a first cryptography logic unit, performing cryptography on data of the first memory cacheline if the data is to be encrypted or decrypted; and using a second cryptography logic unit, speculatively accessing data associated with a second memory cacheline based on the first memory cache line before receiving a request to perform an a first operation on data in the second memory cacheline;

receiving a request to perform a second operation on data in the second memory cacheline; and employing the speculatively accessed data to complete the second operation;

wherein employing the speculatively accessed data to complete the second operation includes reducing a time required to perform the second operation.

2. The method of claim 1 wherein the second operation includes cryptography on data in the second memory cacheline.

3. The method of claim 1 wherein the first and second memory cachelines are successive.

4. The method of claim 1 further comprising, in response to receiving a request to perform a third operation, stopping the speculative access to perform the third operation.

5. The method of claim 1 wherein speculatively accessing data associated with a second memory cacheline includes speculatively accessing data in the second memory cacheline.

6. A cryptography apparatus, comprising: controller logic, adapted to couple to a processing unit and a memory of a system, and further adapted to:in response to receiving a request to perform a first operation on data in a first memory cacheline, access data associated with the first memory cacheline; using a first cryptography logic unit, perform cryptography on data of the first memory cacheline if the data is to be encrypted or decrypted; and using a second cryptography logic unit, speculatively access data associated with a second memory cacheline based on the first memory cacheline before receiving a request to perform an a first operation on data in the second memory cacheline; receive a request to perform a second operation on data in the second memory cacheline; and employ the speculatively accessed data to complete the second operation; wherein the controller logic is further adapted to reduce a time required to perform the second operation.

7. The apparatus of claim 6 wherein the second operation includes cryptography on data in the second memory cacheline.

8. The apparatus of claim 6 wherein the first and second memory cachelines are successive.

9. The apparatus of claim 6 wherein the controller logic is further adapted to, in response to receiving a request to perform a third operation, stop the speculative access to perform the third operation.

10. The apparatus of claim 6 wherein the controller logic is further adapted to speculatively access data in the second memory cacheline.

11. A cryptography system, comprising:
a processing unit;
a memory; and
controller logic, coupled to the processing unit and memory, and adapted to:
in response to receiving a request to perform a first operation on data in a first memory cacheline, access data associated with the first memory cacheline;
using a first cryptography logic unit, perform cryptography on data of the first memory cacheline if the data is to be encrypted or decrypted; and
using a second cryptography logic unit, speculatively access data associated with a second memory cacheline based on the first memory cacheline before receiving a request to perform an a first operation on data in the second memory cacheline;
receive a request to perform a second operation on data in the second memory cacheline; and
employ the speculatively accessed data to complete the second operation;
wherein the controller logic is further adapted to reduce a time required to perform the second operation.

12. The cryptography system of claim 11 wherein the second operation includes cryptography on data in the second memory cacheline.

13. The cryptography system of claim 11 wherein the first and second cachelines are successive.

14. The cryptography system of claim 11 wherein the controller logic is further adapted to, in response to receiving a request to perform a third operation, stop the speculative access to perform the third operation.

* * * * *